United States Patent
Searles

(10) Patent No.: US 7,961,533 B2
(45) Date of Patent: Jun. 14, 2011

(54) METHOD AND APPARATUS FOR IMPLEMENTING WRITE LEVELIZATION IN MEMORY SUBSYSTEMS

(75) Inventor: Shawn Searles, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 400 days.

(21) Appl. No.: 12/127,059

(22) Filed: May 27, 2008

(65) Prior Publication Data

US 2009/0296501 A1 Dec. 3, 2009

(51) Int. Cl.
*G11C 7/00* (2006.01)
(52) U.S. Cl. ......... 365/193; 365/191; 365/233; 365/194
(58) Field of Classification Search .................. 365/193, 365/191, 233, 194; 375/355
See application file for complete search history.

(56) References Cited

U.S. PATENT DOCUMENTS

| | | | |
|---|---|---|---|
| 5,373,255 A | 12/1994 | Bray | |
| 5,440,515 A | 8/1995 | Chang | |
| 5,857,095 A | 1/1999 | Jeddeloh et al. | |
| 6,691,214 B1 | 2/2004 | Li | |
| 6,873,564 B2 | 3/2005 | Roohparvar | |
| 6,930,932 B2 * | 8/2005 | Rentschler | 365/193 |
| 7,038,971 B2 | 5/2006 | Chung | |
| 7,117,381 B2 | 10/2006 | Kim | |
| 7,184,323 B2 | 2/2007 | Fujisawa | |
| 7,304,910 B1 | 12/2007 | Hanzawa | |
| 7,321,525 B2 | 1/2008 | Matsui | |
| 7,457,174 B2 | 11/2008 | Braun | |
| 7,487,378 B2 | 2/2009 | Morein | |
| 7,518,946 B2 | 4/2009 | Iwasaki | |
| 2002/0147896 A1 | 10/2002 | Rentschler | |
| 2003/0021164 A1 | 1/2003 | Yoo et al. | |
| 2004/0143775 A1 | 7/2004 | Li et al. | |

(Continued)

FOREIGN PATENT DOCUMENTS

WO 2008/063199 5/2008

OTHER PUBLICATIONS

International Search Report in application No. PCT/US2009/003220 mailed Sep. 15, 2009.
"Double Data Rate (DDR) SDRAM Specification," JESD79, Release 2, JEDEC Solid State Technology Association, JEDEC Standard, Electronics Industries Alliance, May 2002.

(Continued)

*Primary Examiner* — Tuan T Nguyen
*Assistant Examiner* — Toan Le
(74) *Attorney, Agent, or Firm* — Meyertons, Hood, Kivlin, Kowert & Goetzel, P.C.; Erik A. Heter

(57) ABSTRACT

Methods and apparatus for aligning a clock signal and a set of strobe signals are disclosed. In one embodiment, a memory controller includes a clock generator configured to generate the clock signal, and a respective strobe signal generator configured to generate each strobe signal. The memory controller further includes a phase recovery engine configured to receive an error signal from a corresponding memory device, wherein the error signal conveys an error indication indicative of an alignment of the strobe signal relative to the clock signal for each of a plurality of cycles of the strobe signal. The phase recovery engine includes an accumulator configured to maintain an accumulation value that depends upon the error indications for the plurality of cycles of the strobe signal. The strobe signal generator is configured to control a delay associated with generation of the strobe signal depending upon the accumulation value.

20 Claims, 14 Drawing Sheets

U.S. PATENT DOCUMENTS

| | | |
|---|---|---|
| 2005/0197082 A1 | 9/2005 | Agostinelli |
| 2005/0204245 A1 | 9/2005 | Lee |
| 2005/0243608 A1 | 11/2005 | Lee |
| 2006/0114742 A1 | 6/2006 | Salmon et al. |
| 2006/0133158 A1 | 6/2006 | Shin |
| 2006/0262613 A1 | 11/2006 | Braun |
| 2007/0036020 A1 | 2/2007 | Lee |
| 2007/0217559 A1* | 9/2007 | Stott et al. ............... 375/355 |
| 2009/0086562 A1 | 4/2009 | Richards |
| 2009/0244995 A1 | 10/2009 | Searles |
| 2009/0244996 A1 | 10/2009 | Searles |
| 2009/0245010 A1 | 10/2009 | Searles |

OTHER PUBLICATIONS

Notice of Allowance in U.S. Appl. No. 12/059,653 mailed Aug. 10, 2010.

Notice of Allowance in U.S. Appl. No. 12/059,653 mailed Apr. 29, 2010.

Office Action in U.S. Appl. No. 12/059,613 mailed Jul. 27, 2010.

Notice of Allowance in U.S. Appl. No. 12/059,641 issued Nov. 22, 2010.

Notice of Allowance in U.S. Appl. No. 12/059,593 issued Nov. 30, 2010.

* cited by examiner ically, to write levelization mechanisms for memory subsystems.

METHOD AND APPARATUS FOR IMPLEMENTING WRITE LEVELIZATION IN MEMORY SUBSYSTEMS

CROSS REFERENCE TO RELATED APPLICATIONS

This application is related to the following co-pending applications which are incorporated herein by reference in their entirety:
 a. application Ser. No. 12/059,653, filed Mar. 31, 2008, entitled "METHOD FOR TRAINING DYNAMIC RANDOM ACCESS MEMORY CONTROLLER TIMING DELAYS" invented by Shawn Searles, Tahsin Askar, Thomas H. Hamilton, and Oswin Housty.
 b. application Ser. No. 12/059,613, filed Mar. 31, 2008, entitled "CIRCUIT USING A SHARED DELAY LOCKED LOOP (DLL) AND METHOD THEREFOR" invented by Shawn Searles, Nicholas T. Humphries, and Faisal A. Syed.
 c. application Ser. No. 12/059,593, filed Mar. 31, 2008, entitled "CIRCUIT FOR LOCKING A DELAY LOCKED LOOP (DLL) AND METHOD THEREFOR" invented by Shawn Searles, Nicholas T. Humphries, and Faisal A. Syed.
 d. application Ser. No. 12/059,641, filed Mar. 31, 2008, entitled "DATA DRIVER CIRCUIT FOR A DYNAMIC RANDOM ACCESS MEMORY (DRAM) CONTROLLER OR THE LIKE AND METHOD THEREFOR" invented by Shawn Searles, Nicholas T. Humphries, and Faisal A. Syed.

BACKGROUND OF THE INVENTION

1. Field of the Invention

This invention relates to memory subsystems and, more particularly, to write levelization mechanisms for memory subsystems.

2. Description of the Related Art

Various memory subsystem architectures are designed such that a memory clock signal and data strobe (DQS) signals generated by a memory controller arrive phase aligned at the corresponding memory devices to effectively perform read and write operations. In Double Data Rate Synchronous Dynamic Random Access Memory (DDR SDRAM) and DDR2 SDRAM systems, the signals are phase aligned due, at least in part, to the fact that the trace lengths associated with the signals are matched. Since DDR3 SDRAM systems do not have matched trace lengths for these signals, DDR3 SDRAM memory architectures may include mechanisms for performing write levelization to phase align the memory clock signal and the DQS signals at the memory devices.

SUMMARY

Various embodiments are disclosed of a method and apparatus for aligning a clock signal and a set of strobe signals at one or more memory devices of a computing system. In one embodiment, a memory controller includes a clock generator configured to generate the clock signal, and a respective strobe signal generator configured to generate each strobe signal. The memory controller further includes a phase recovery engine associated with each strobe signal generator that is configured to receive an error signal from a corresponding memory device. The error signal conveys an error indication indicative of an alignment of the strobe signal relative to the clock signal for each of a plurality of cycles of the strobe signal. The phase recovery engine includes an accumulator configured to maintain an accumulation value that depends upon the error indications for the plurality of cycles of the strobe signal. The strobe signal generator is configured to control a delay associated with generation of the strobe signal depending upon the accumulation value.

Figure 1:
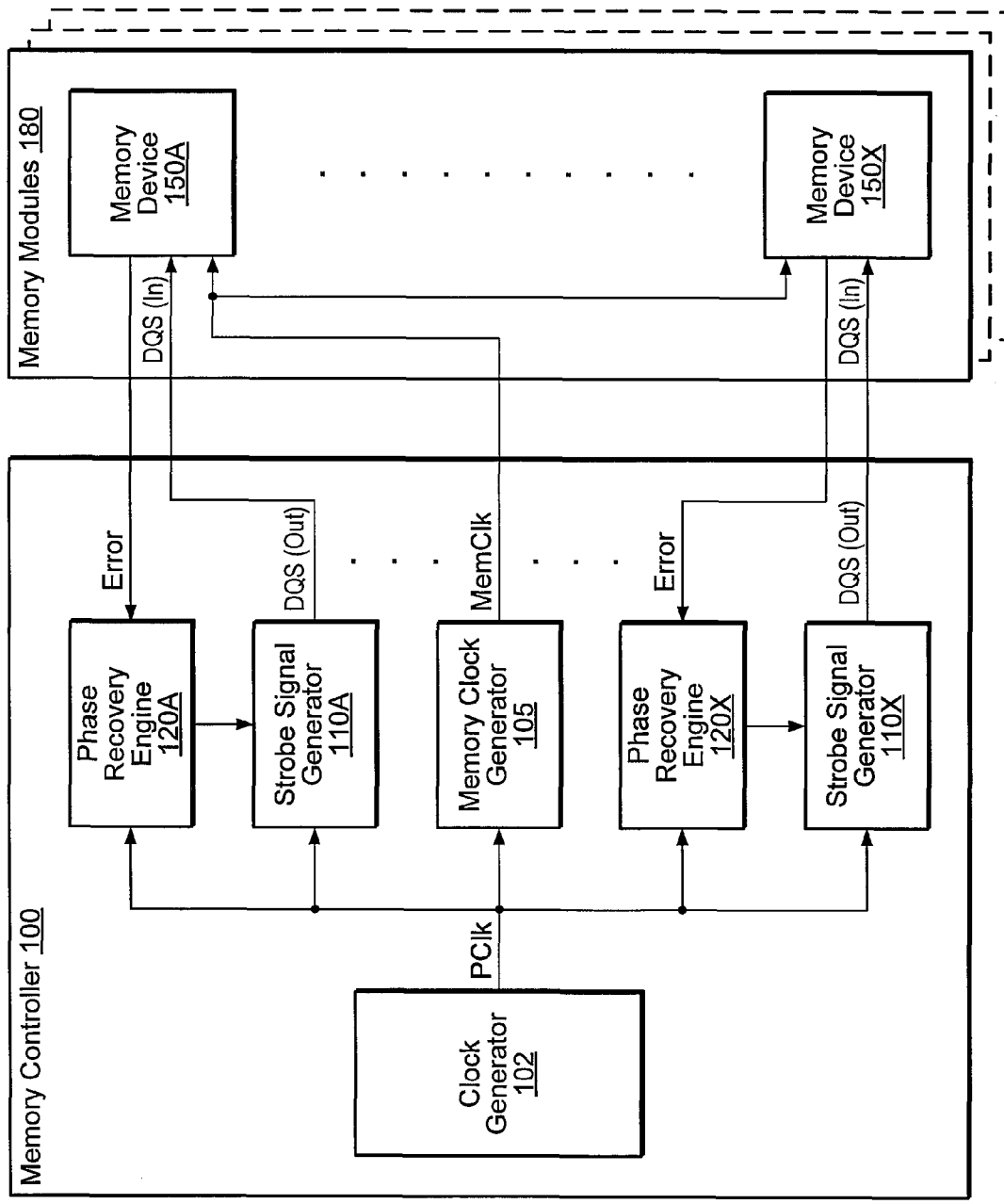
FIG. 1 is a block diagram of one embodiment of a memory subsystem including a memory controller and one or more memory modules.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram is shown of a memory subsystem comprising a memory controller 100 and one or more memory modules 180, according to one embodiment. As illustrated, memory controller 100 may include a clock generator 102, a memory clock generator 105, a plurality of data strobe signal generators 110A-X, and a plurality of phase recovery engines 120A-X. Memory modules 180 may each include a plurality of memory devices 150A-X. As will be further described below, memory controller 100 may support a write levelization algorithm to phase align a memory clock (MemClk) signal and corresponding data strobe (DQS) signals at the memory devices 150 to effectively perform memory read and write operations.

In one specific implementation, clock generator 102 may be coupled to memory clock generator 105, strobe signal generators 110A-X, and phase recovery engines 120A-X. Memory clock generator 105 may be coupled to the memory devices 150A-X. Each of the memory devices 150A-X of memory modules 180 may be coupled to a corresponding strobe signal generator 110 via a DQS signal line, and to a corresponding phase recovery engine 120 via an Error signal line. For example, memory device 150X may be coupled to strobe signal generator 110X and phase recovery engine 120X. Each of the phase recovery engines 120A-X may also be coupled to a corresponding strobe signal generator 110.

Memory controller 100 and memory modules 180 may be included in any of various types of computing or processing systems, e.g., a personal computer (PC), a workstation, a server blade, a portable computing device, a game console, a system-on-a-chip (SoC), a television system, an audio system, among others. Memory controller 100 and memory modules 180 may be connected to a circuit board or motherboard of a computing system. In various embodiments, memory controller 100 may be integrated within a processor of the computer system. In other embodiments, memory controller 100 may be implemented externally to the processor via a separate chipset. Memory modules 180 may form the main system memory of the computer system (e.g., system memory 640 of FIG. 14). Memory modules 180 may be Dual In-line Memory Modules (DIMMs), and memory devices 150 may be RAM devices, such as DDR3 SDRAM devices. It is noted, however, that in other embodiments the write levelization algorithm may be implemented in memory subsystems that include other types of memory to phase align a MemClk signal and the corresponding DQS signals at the memory devices.

During operation, clock generator 102 may generate a clock signal (PClk) that serves as the internal clock of memory controller 100. In one specific implementation, for DDR3 SDRAM systems, the internal clock may run at 1600 Mhz. The internal clock signal may be provided to various components of memory controller 100, such as strobe signal generators 110 and memory clock generator 105. In one embodiment, the internal clock signal may serve as the timing reference used by memory clock generator 105 to generate the memory clock (MemClk) signal. As shown, the MemClk signal is provided to each of the memory devices 150. In one specific implementation, the MemClk signal may be generated at half the frequency of the internal clock signal PClk (e.g., at 800 MHz).

The internal clock signal (PClk) may also serve as a timing reference used by each of the strobe signal generators 110 to generate a respective data strobe (DQS) signal that is provided to a corresponding memory device 150. For example, strobe signal generator 110A provides a corresponding DQS signal to memory device 150A. The DQS signals are used to control data read and write operations associated with memory devices 150 during normal modes of operation of the memory subsystem, as will be appreciated by one of skill in the art.

Figure 2A:
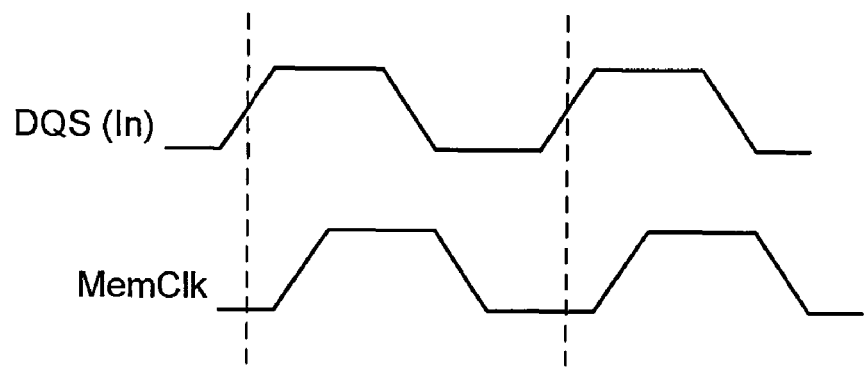
FIGS. 2A-C are timing diagrams illustrating the alignment of a data strobe (DQS) signal relative to a memory clock (MemClk) signal, according to one embodiment.
Figure 2B:
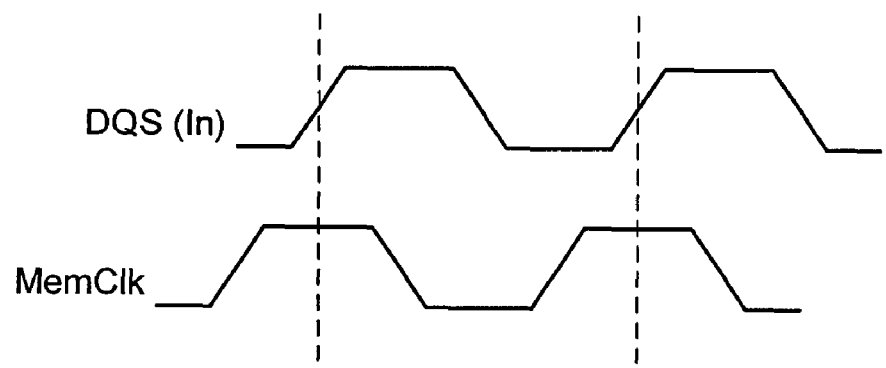
Figure 2C:
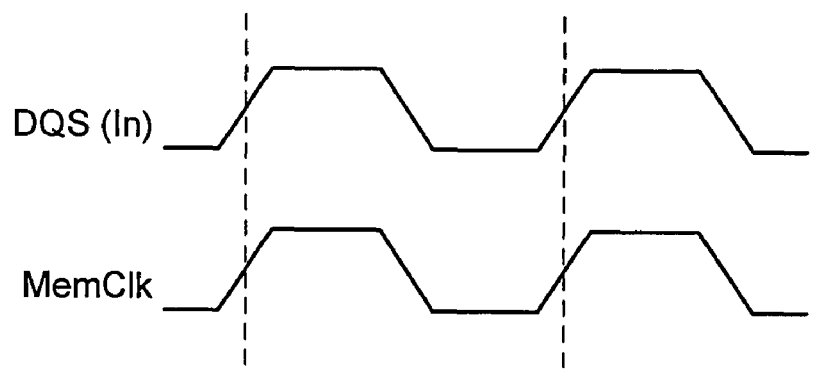

During the write levelization procedure, the DQS signals may be provided as test signals to sample the MemClk signal at the memory devices 150 to thereby determine the phase alignment of each DQS signal relative to the MemClk signal. In particular, each strobe signal generator 110 may generate its corresponding DQS signal in the form of cycles (or strobes) having the same frequency as the MemClk signal. The DQS signals and the MemClk signal may start out aligned at memory controller 100; however, when the signals arrive at the memory devices 150, an individual DQS signal may be ahead of the MemClk, as illustrated in FIG. 2A, or behind the MemClk, as illustrated in FIG. 2B. Since the signals take completely disparate paths to the memory devices 150, and the trace lengths may not be matched, different delays may be introduced that may cause the signals to arrive unaligned at the memory devices 150. Write levelization may be implemented in the memory subsystem to either delay or speed up an individual DQS signal to phase align the DQS signal and the MemClk, as will be further described below. After write levelization, each DQS signal may be aligned relative to the MemClk when received at the corresponding memory device 150, as illustrated in FIG. 2C. Subsequent to this initialization procedure, the memory subsystem may enter a mode of operation that allows normal data read and write operations to be performed.

Phase recovery engines 120 may be used to interpret and process Error signals received from the corresponding memory devices 150 to implement the write levelization algorithm. Each phase recovery engine 120 may receive an indication of an error in response to each cycle of the DQS signal sent to the corresponding memory device 150. The phase recovery engine may then process the error indications to generate alignment information that determines whether to increase or decrease a delay associated with the corresponding DQS signal to achieve phase alignment relative to the MemClk signal. It is noted that in various embodiments the feedback path for receiving the Error signals during the write levelization procedure may be the same lines used for data transfers during normal memory read and write operations, e.g., the bidirectional data (DQ) lines in memory subsystems. Further details regarding specific implementations of the write levelization procedure are described below in conjunction with FIGS. 3-14.

It should be noted that the components described with reference to FIG. 1 are meant to be exemplary only, and are not intended to limit the invention to any specific set of components or configurations. For example, in various embodiments, one or more of the components described may be omitted, combined, modified, or additional components may be included, as desired.

Figure 3:
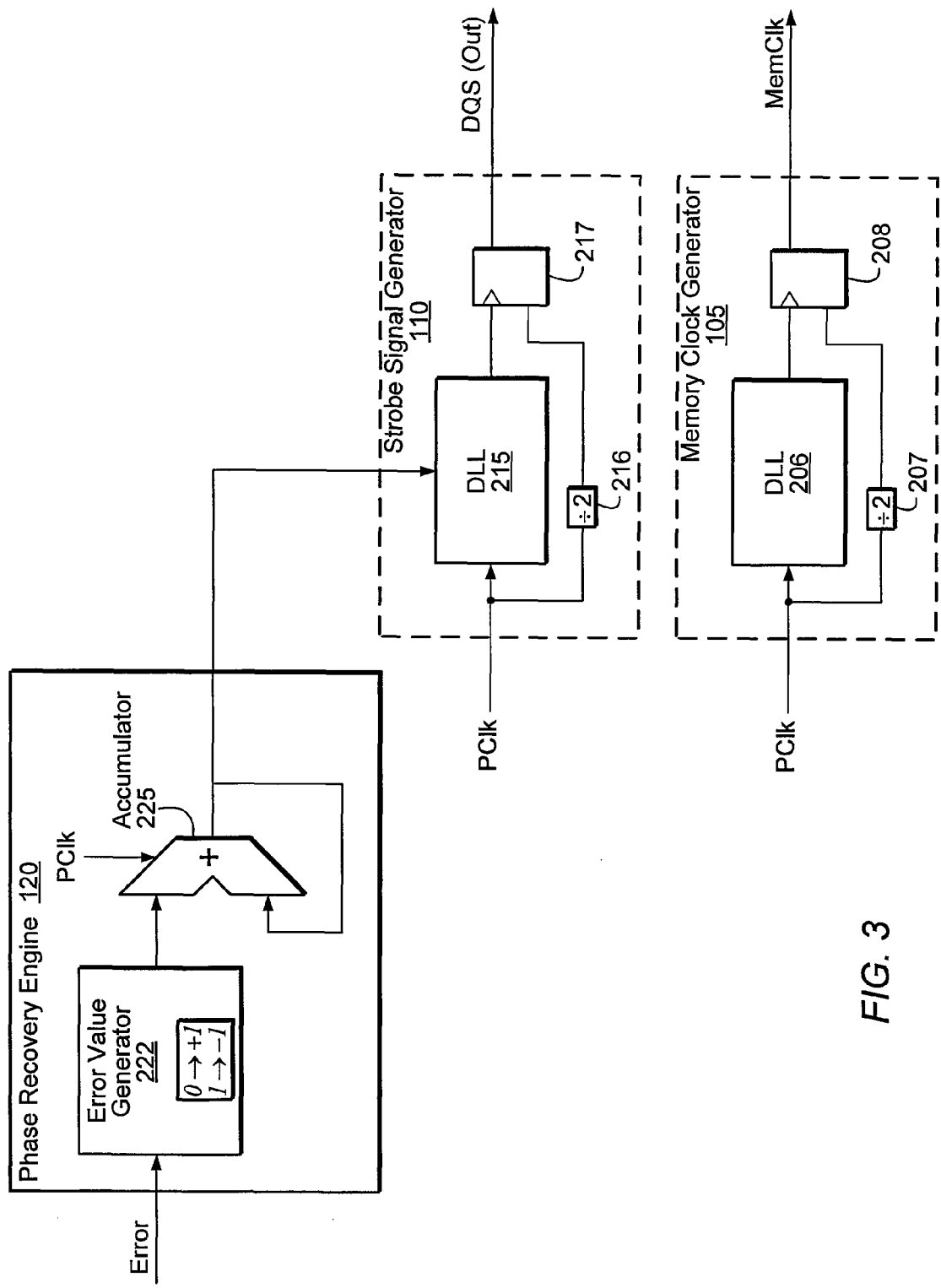
FIG. 3 is a block diagram of one embodiment of a memory clock generator, a strobe signal generator, and a phase recovery engine.
Figure 4:
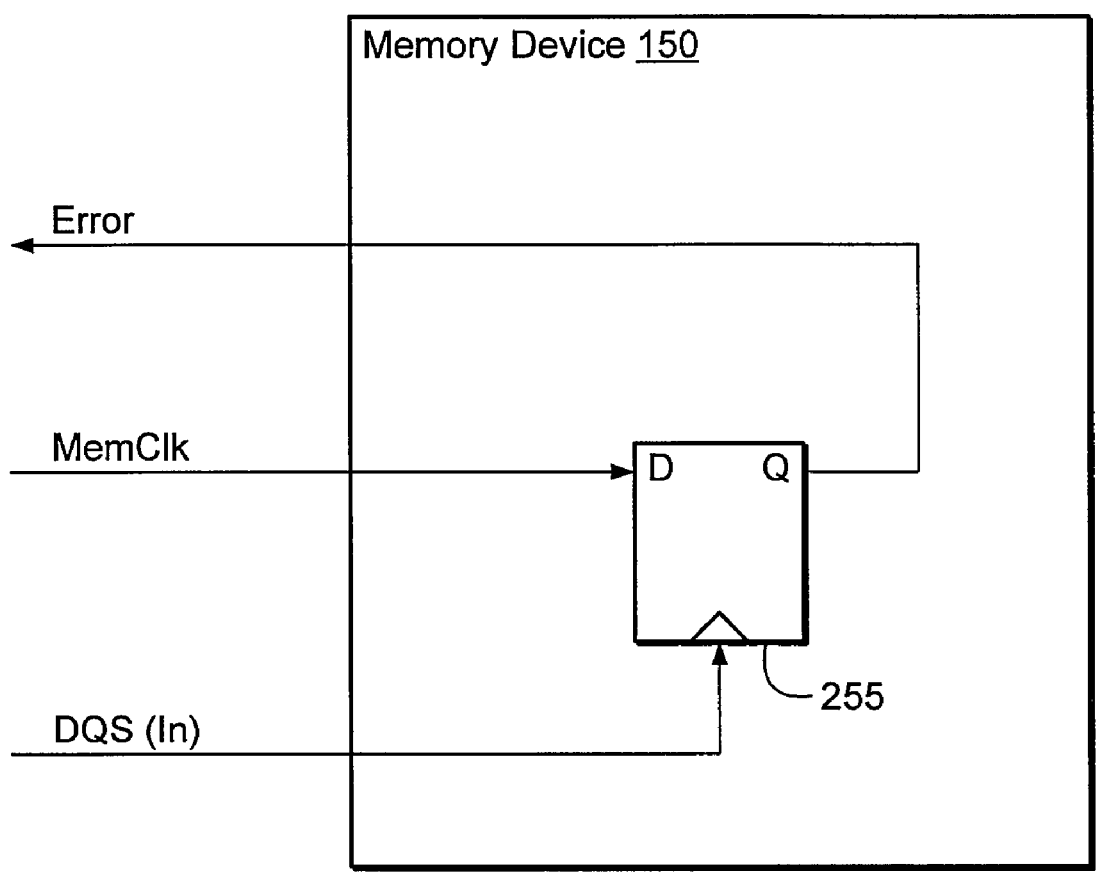
FIG. 4 is a block diagram of one embodiment of a memory device of a memory module.

FIG. 3 is a generalized block diagram of one embodiment of a memory clock generator 105, a strobe signal generator 110 (e.g., representative of any of strobe signal generators 110A-110X of FIG. 1), and a phase recovery engine 120 (e.g., representative of the corresponding phase recovery engine 120A-120X). FIG. 4 is a block diagram of one embodiment of a memory device 150 (e.g., representative of the corresponding memory device 150A-150X). As shown, memory clock generator 105 may include a delay-locked loop (DLL) device 206, a divide-by-two divider circuit 207, and a flip-flop 208. Similarly, strobe signal generator 110 may include a DLL device 215, a divide-by-two divider circuit 216, and a flip-flop 217. Phase recovery engine 120 is shown with an error value generator 222 and an accumulator 225. Finally, memory device 150 is shown with a flip-flop 255. It is noted that various circuitry that may be used in association with specific implementations of the illustrated circuit components such as signal drivers, bias circuitry, multiplexers, etc. may be omitted from the diagram for simplicity and clarity.

Figure 5:
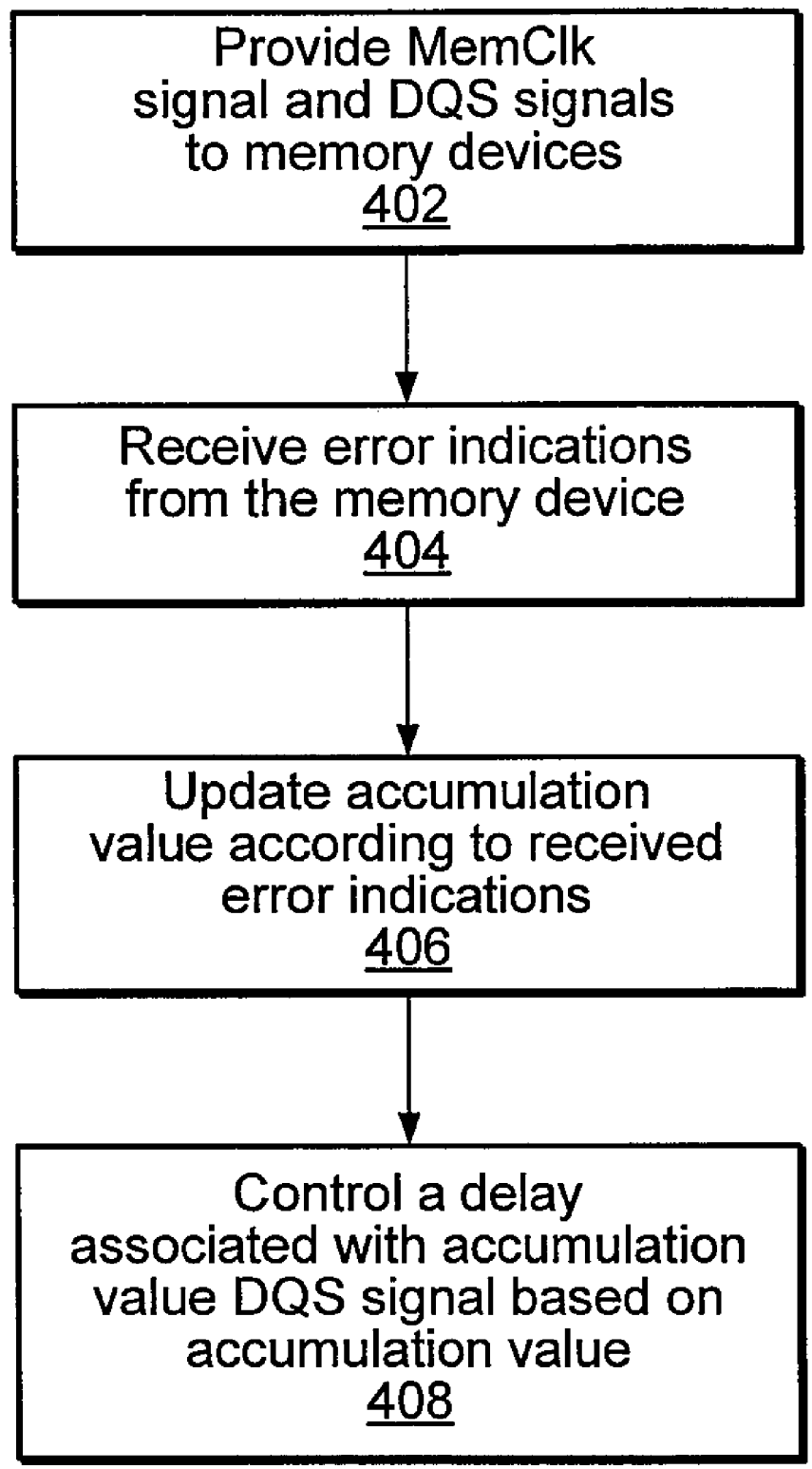
FIG. 5 is a flow diagram illustrating a method for performing write levelization in a memory subsystem, according to various embodiments.

Referring collectively to FIGS. 1-4 and the associated flow diagram of FIG. 5, during the write levelization procedure, memory clock generator 105 of memory controller 100 provides the MemClk signal (at half the frequency of PClk, in this embodiment) to each memory device 150 of memory modules 180, and each strobe signal generator 110 provides to the corresponding memory device 150 a respective DQS signal that cycles at the frequency of the MemClk signal (block 402). As described previously, the DQS signals and the MemClk signal are provided to generate error indications to determine the phase alignment of each DQS signal relative to the MemClk signal at the corresponding memory device 150.

Figure 6A:
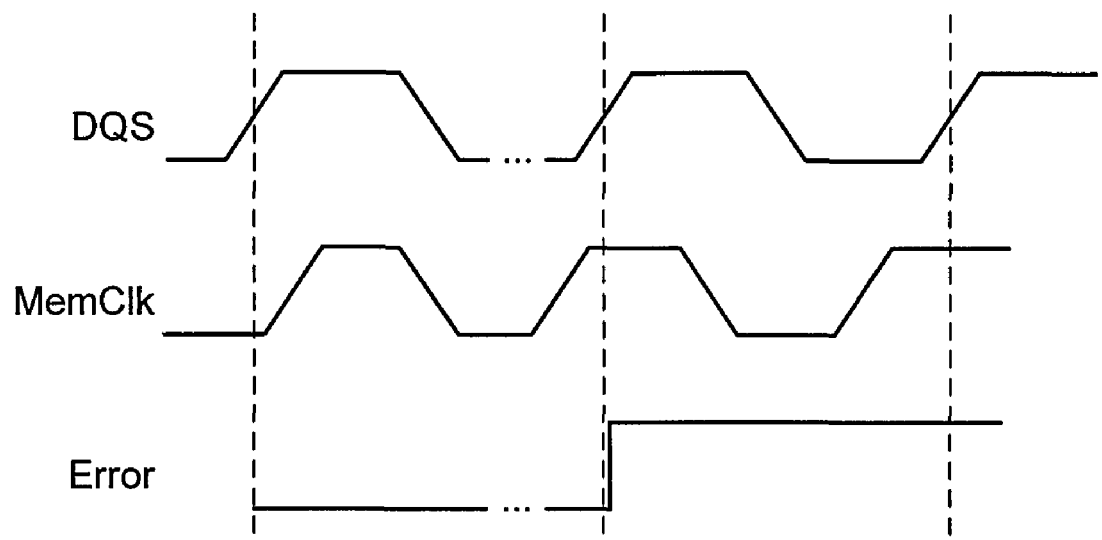
FIGS. 6A and 6B are timing diagrams illustrating a generation of an error signal indicative of alignment between a DQS signal and the MemClk signal.
Figure 6B:
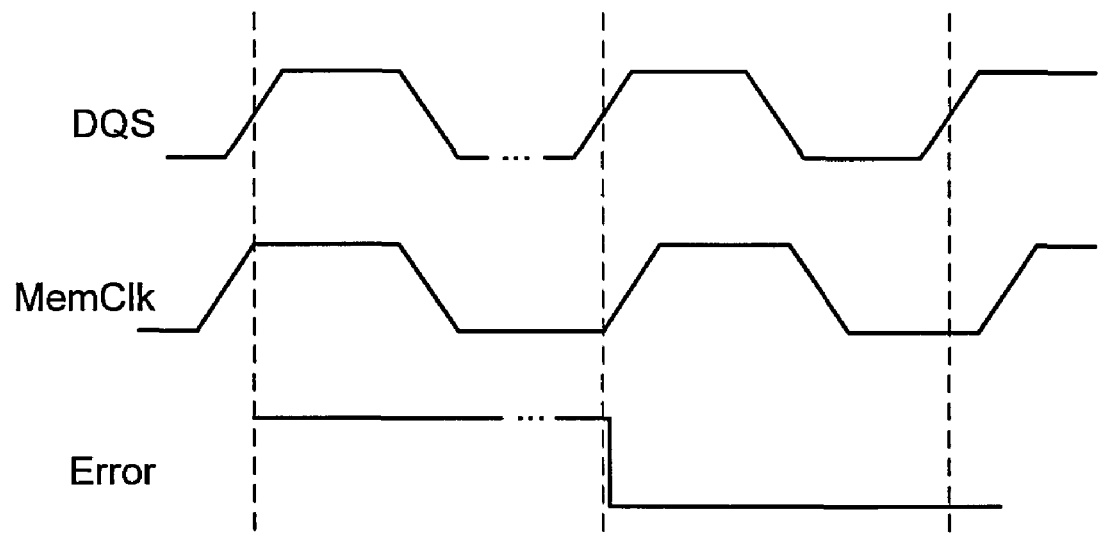

In the depicted embodiment, each rising edge of a cycle of the DQS signal provided to memory device 150 results in the sampling of the MemClk signal, e.g., using flip-flop 255. In response to the sampling operations, phase recovery engine 120 may receive error indications from the memory device 150 (block 404). Specifically, in the depicted embodiment, the rising edge of each cycle of the DQS signal causes flip flop 255 to sample the MemClk signal, and thus the corresponding Error signal is driven either low or high depending upon the alignment of the DQS signal relative to the MemClk signal at the memory device 150. For example, as illustrated in FIG. 6A, upon a first rising edge of the DQS signal, MemClk may be sampled low, and thus the Error signal provided from the corresponding memory device 150 is driven low. Upon a subsequent rising edge of the DQS signal (illustratively shown with a slight phase shift relative to the MemClk signal), the MemClk signal is sampled high, and thus the Error signal is driven high. FIG. 6B illustrates a similar example where the MemClk signal is first sampled high, resulting in a high Error signal, and subsequently sampled low, resulting in a low Error signal.

In response to receiving the error indications conveyed in the Error signal, the corresponding phase recovery engine 120 may update an associated accumulation value (block 406). For example, in the embodiment of FIG. 3, an accumulation value (which may be initialized with a particular starting value, as described below) may be maintained by accumulator 225. Upon each cycle of the DQS signal, error value generator 222 of phase recovery engine 120 associates the state of the Error signal with either a first value (such as −1 if the Error signal is high) or a second value (such as +1 if the Error signal is low), and provides the first or second value to accumulator 225. Accumulator 225 may add the value provided from error value generator 222 (or a value dependent thereon) with the then-current accumulation value to derive an updated accumulation value (e.g., upon each cycle of the DQS signal). It is thus noted that the accumulation value maintained by accumulator 225 either increases or decreases depending on the phase alignment of the DQS signal relative to the MemClk signal. The accumulation value, or a signal dependent thereon, is correspondingly provided to DLL 215 to control a delay associated with the generation of the corresponding DQS signal. In this manner, the alignment of the DQS signal relative to the MemClk signal may be adjusted and controlled in a feedback fashion to achieve phase alignment. It is noted that the general operations described above with reference to blocks 402-408 of FIG. 5 may be implemented using a variety of specific mechanisms and methods, such as those discussed below with reference to FIGS. 7-14. In addition, it is noted that the delay-locked loop devices described herein (e.g., DLL 215) may be replaced with other phase-controllable signal generation devices such as phase interpolators in other embodiments.

Figure 7:
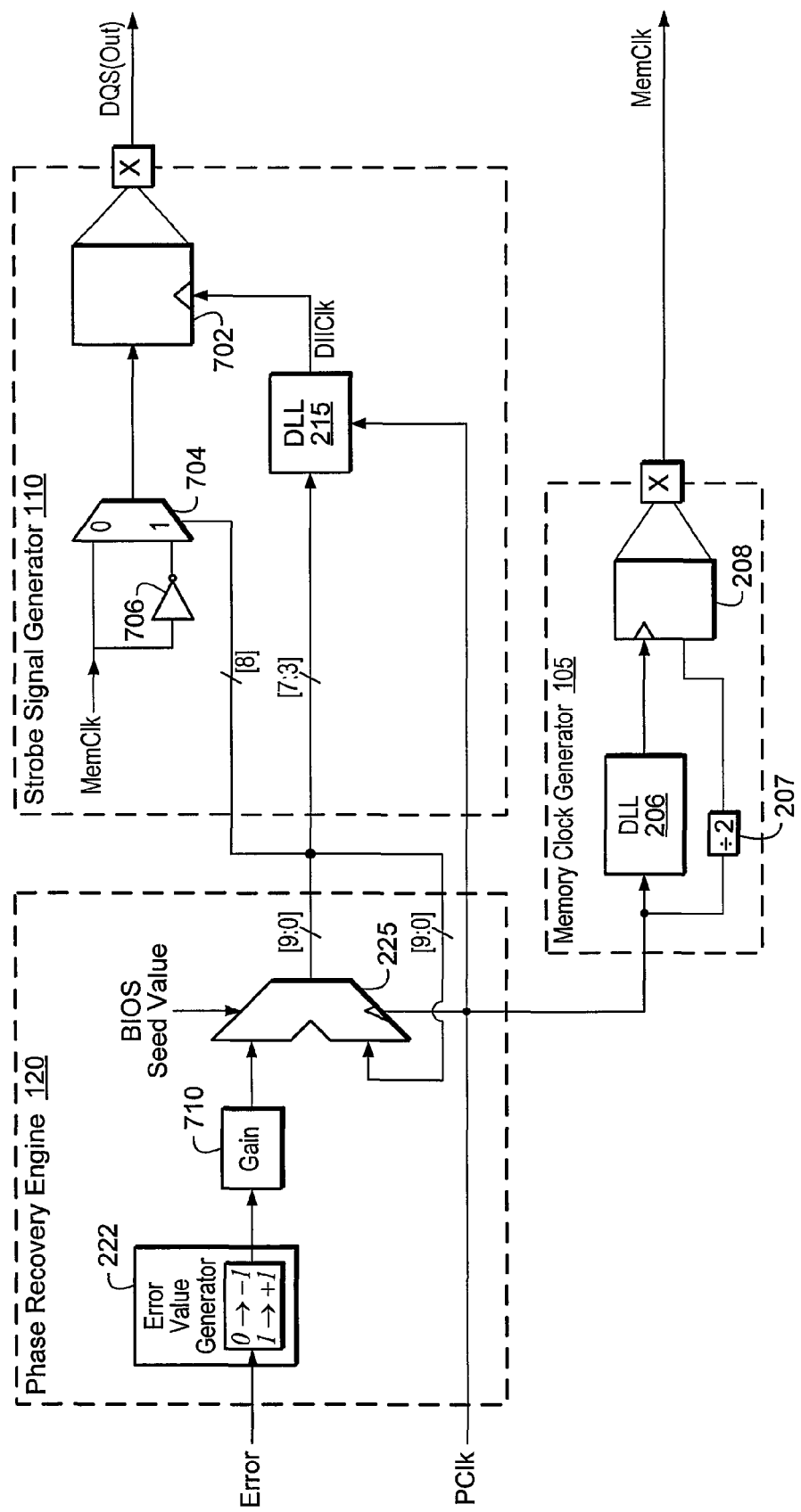
FIG. 7 is a block diagram of one particular implementation of a memory clock generator, a strobe signal generator and a phase recovery engine.

FIG. 7 is a block diagram of one particular implementation of memory clock generator 105, strobe signal generator 110, and phase recovery engine 120. Circuit portions that correspond to those of FIG. 3 are numbered identically for simplicity and clarity. In the depicted embodiment, memory clock generator 206 is shown with a divide-by-two clock divider 701 coupled to an output of DLL 206. Strobe signal generator 110 is shown with DLL 215, a flip-flop 702, a 2:1 multiplexer 704, and an inverter 706. Phase recovery engine 120 is shown with a gain unit 710 coupled between error value generator 222 and accumulator 225.

Figure 8:
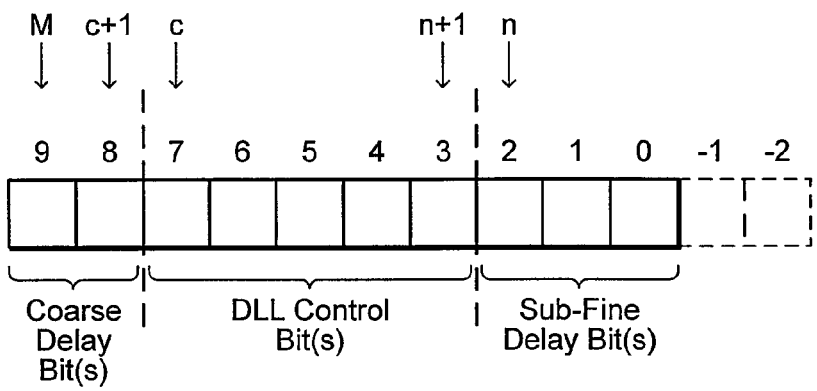
FIG. 8 illustrates fields of an accumulation value maintained by an accumulator.

In the embodiment of FIG. 7, accumulator 225 is configured to maintain an accumulation value including three fields. In particular, as illustrated in FIG. 8, in one embodiment the accumulation value maintained by accumulator 225 is a 10-bit value formed by bits [9:0]. Bits [2:0], referred to herein as the sub-fine delay bits (or field), provide averaging for noise and provide delay between the update of DLL 215 and a corresponding return in the error signal, thereby providing stability. Bits [7:3] control the delay associated with DLL 215. Bits [9:8] are provided to control the coarse delay, as discussed further below. It is noted that while in the depicted embodiment the sub-fine delay bits are formed by bits [2:0], in other embodiments, the sub-fine delay bits [n:0] may be formed by a different number of one or more bits. Likewise, the DLL control bits [c:n+1] and the coarse delay bits [M:c+1] may also each be formed by a different number of one or more bits.

Figure 9:
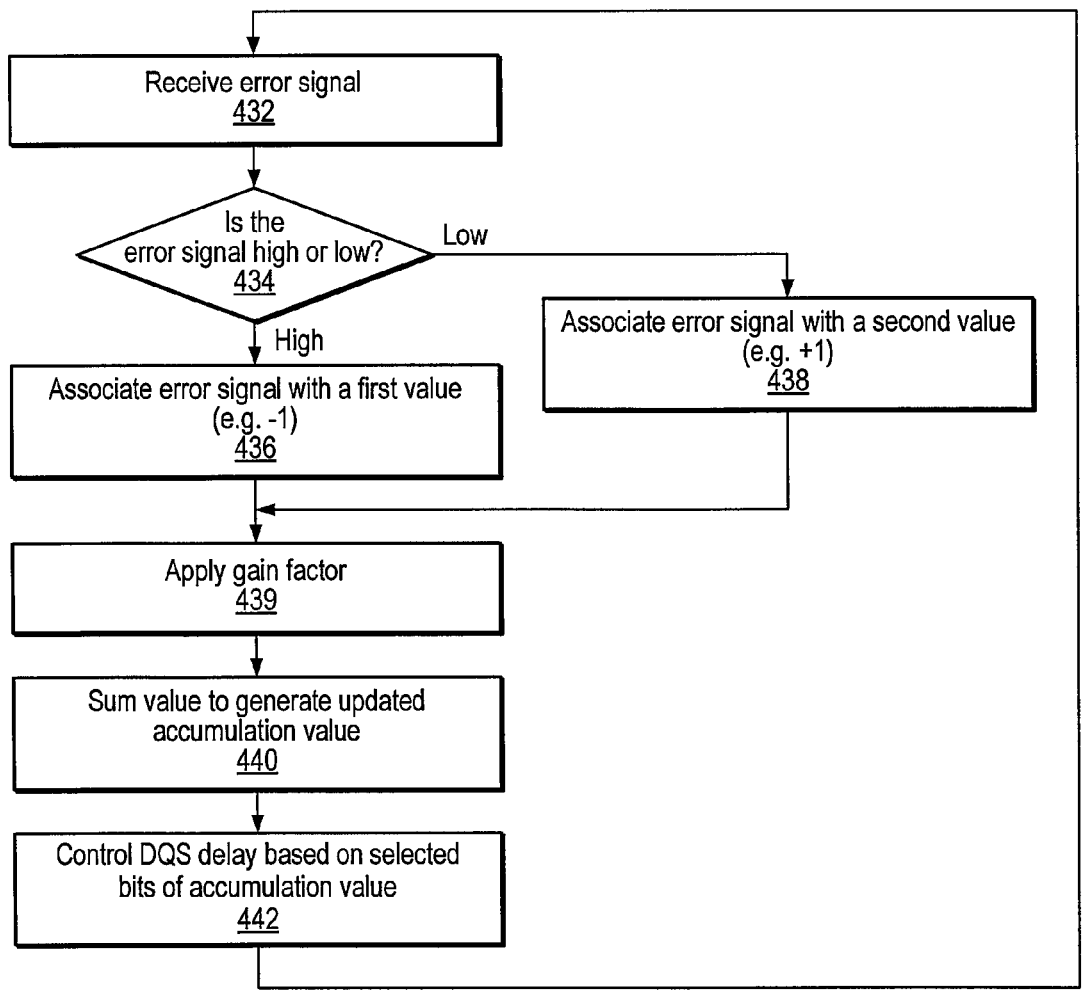
FIG. 9 is a flow diagram illustrating operations associated with the embodiment of FIG. 7.
Figure 10:
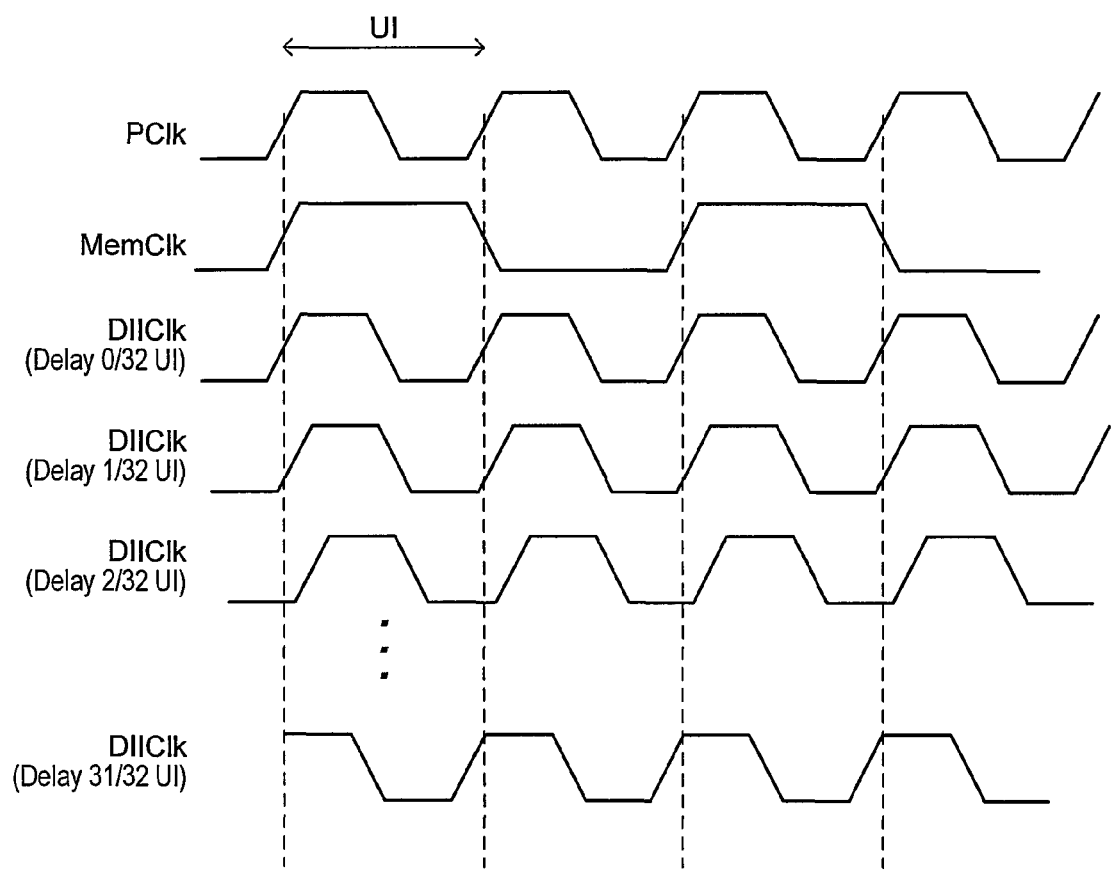
FIGS. 10 and 11 are timing diagrams illustrating signals associated with the embodiment of FIG. 7.
Figure 11:
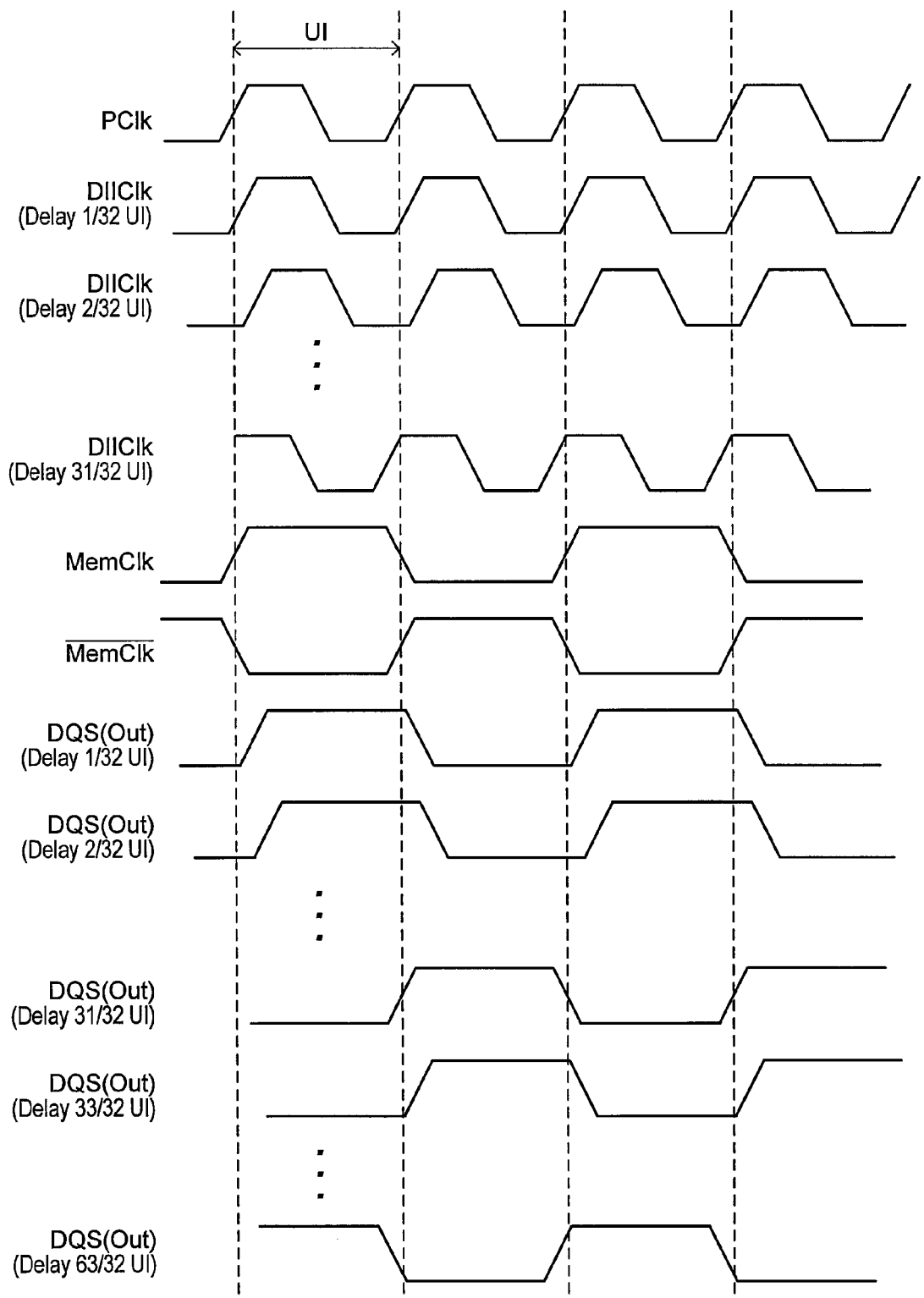

The operation of the embodiment of FIG. 7 is discussed in conjunction with the flow diagram of FIG. 9 and timing diagrams of FIGS. 10 and 11. As discussed previously, during the write levelization procedure, error value generator 222 may receive an error indication conveyed in the Error signal upon each rising edge of the corresponding DQS signal (block 432). When the received Error signal is in a low state, it may indicate that the DQS signal received at the corresponding memory device 150 is ahead of the MemClk signal (as illustrated in FIG. 2A). When the received Error signal is in a high state, it may indicate that the DQS signal is behind the MemClk signal (as illustrated in FIG. 2B). Error value generator 222 may associate the error indication with a first value, such as −1, when the error signal is high (blocks 434 and 436), or a second value, such as +1, when the error signal is low (blocks 434 and 438).

In the embodiment of FIG. 7, the first or second value from error value generator 222 is provided to gain unit 710, which amplifies (or attenuates) the provided value (block 439). For example, gain unit 710 may increase the value +1 to +8, or the value −1 to −8, and provide the resulting amplified value to accumulator 225. For each cycle of the DQS signal, accumulator 225 sums the amplified value from gain unit 710 with its then-current accumulation value to derive an updated accumulation value (block 440). It is noted that the particular amount of gain as provided by gain unit 710 may control the extent to which the accumulation value increases or decreases upon each sampling of the DQS signal. It is further noted that the amount of gain provided by gain block 710 may be programmable. In addition, in embodiments where gain unit 710 may provide less than unity gain, it is noted that the sub-fine delay field of the accumulation value as maintained by accumulator 225 may include one or more additional bits (e.g., denoted as bits [−1] and [−2] in FIG. 8) to allow accumulation of such sub-unity values).

As shown, bits [7:3] of the accumulation value are provided to control the delay associated with an output signal (DllClk) of DLL 215. In one embodiment, the DllClk signal may be controllably delayed in fractional increments of 1/32 of a unit interval (UI), where a unit interval equals the period of the internal clock PClk. FIG. 10 illustrates several versions of the DllClk signal, delayed from between 0/32 to 31/32 of a unit interval with respect to the PClk signal. Depending upon bits [7:3] of the accumulation value, DLL 215 generates the DllClk signal according to one of these selected delays, and provides such signal to control the clocking of flip flop 702. It is noted that FIG. 10 also illustrates the MemClk signal as output from divide-by-two circuit 701. As shown, in this particular embodiment, the MemClk signal has a frequency that is half that of the internal clock PClk.

As is also shown in FIG. 7, bit [8] of the accumulation value is provided to a select input of multiplexer 704. Multiplexer 704 receives the MemClk signal at one of its inputs, and an inverted version of the MemClk signal at its other input. Depending upon bit [8] of the accumulation value, multiplexer 704 causes either the MemClk signal or the inverted version of the MemClk signal to be provided as an input to flip flop 702. It is noted that in some embodiments, rather than receiving the MemClk signal from memory clock generator 110, strobe signal generator may separately generate a duplicate version of the MemClk signal using a separate divide-by-two circuit that receives the internal clock PClk and divides its frequency by two.

As a result of the circuit configuration of FIG. 7, upon each rising edge of the DllClk signal as generated by DLL 215 (and delayed in accordance with bits [7:3] of the accumulation value), flip flop 702 samples either the MemClk signal or the inverted version of the MemClk signal, depending upon bit [8] of the accumulation value. As illustrated in FIG. 11, the DQS signal as represented by the output of flip flop 702 thus cycles at a frequency of the MemClk signal, with a controlled delay of between 0/32 UI to 63/32 UI in 1/32 UI increments, based upon the accumulation value. It is noted that if bit [9] is included, the delay may be conceptually controlled from 0/32 UI to 127/32 UI (and so on for further bits that may be provided in the coarse delay field, as desired). Thus, if the DllClk signal generated by DLL 215 is associated with a delay of 1/32 UI and bit [8] of the accumulation value is low, the MemClk signal is sampled high upon the first illustrated rising edge of the DllClk signal (having a delay corresponding to 1/32 UI), thus causing the DQS signal to be driven high. Upon the next rising edge of the illustrated DllClk signal, the MemClk signal is sampled low, thus causing the DQS signal to transition low, and so on. In this manner, a DQS signal as represented by the output of flip flop 702 with a delay corresponding to 1/32 UI may be generated. On the other hand, if bit [8] of the accumulation value is high, the first rising edge of the DllClk signal results in the sampling of the low state of the inverted version of the MemClk signal (i.e., $\overline{MemClk}$), thus causing the DQS signal to be driven low. Upon the next rising edge of the illustrated DllClk signal, the $\overline{MemClk}$ MemClk signal is sampled high, thus causing the DQS signal to transition high, and so on. In this manner, a DQS signal with a delay corresponding to 33/32 UI may be generated. Other delayed versions of the DQS signal may be generated similarly.

As error indications resulting from successive cycles of the DQS signal are received by error value generator 222, the accumulation value maintained by accumulator 225 will converge to a value that achieves and maintains alignment of the DQS signal and the MemClk signal at the corresponding memory device 150. If, for example, the DQS signal is significantly ahead of the MemClk signal, the accumulation value will gradually increase, which will cause strobe signal generator 110 to output increasingly delayed versions of the DQS signal (i.e., to retard or delay the DQS signal). Likewise, if the DQS signal is significantly behind the MemClk signal, the accumulation value will gradually decrease, which will cause strobe signal generator 110 to decrease the delay associated with (i.e., advance or speed up) the DQS signal. Eventually, due to the looped feedback configuration of the circuitry, the accumulation value will converge to a value that maintains alignment between the DQS signal and the MemClk signal as received at the corresponding memory device 150.

It is noted that the sub-fine delay bits [n:0] of the accumulation value maintained by accumulator 225 provide averaging for noise and further provide stability. In particular, consider an embodiment (as illustrated in FIG. 7) wherein the sub-fine delay bits are formed by a total of three bits (e.g., [2:0]). In such an embodiment, if the bits are initially all logic 0 (i.e., "000"), it will take eight consecutive "+1" error values from error value generator 222/gain unit 710 to cause bit 3 of the accumulation value to increment (which causes a corresponding change to the delay associated with the DQS signal). Likewise, if the sub-fine delay bits are initially all logic 1 (i.e., "111"), it will take eight "−1" error values from error value generator 222/gain unit 710 to cause bit 3 to decrement. Thus, as the accumulation value converges to a value that maintains alignment between the DQS signal and the MemClk signal, noise in the system that may cause random incrementing and decrementing of the accumulation value may not result in any change to the selected delay of the DQS signal (e.g., since bits [8:3] of the accumulation value may not be affected). This averaging also acts to stabilize any external delay in the loop.

It is also noted that in the embodiment of FIG. 7, DLL 215 is controllable to generate the DllClk signal with a delay of from 0/32 UI to 31/32 UI. However, since the frequency of the MemClk signal is half that of the DllClk signal, the coarse delay bit [c+1] of the accumulation value (e.g., bit [8]) is used to control whether a high phase of the MemClk signal (i.e., MemClk) or a low phase of the MemClk signal (i.e., $\overline{MemClk}$) is provided as an input for sampling by flip flop 702. In this manner, the DQS signal may be generated with an associated delay that may be selected in a range that spans the entire period of the MemClk signal (i.e., 2 UI), even though DLL device 215 may only configured to provide a selectable delay that can span a range of 1 UI. It is noted that in various embodiments, one or more higher order bits forming the coarse delay field (e.g., bit [9]) of the accumulation value may be provided to simplify the tracking of accumulator wrapping (i.e., overflow or underflow).

Once the accumulation value converges to a value that achieves alignment between the DQS signal and the MemClk signal, the write levelization procedure may be terminated. In various embodiments, the total number of iterations of the operations as depicted in FIG. 9 that may be performed may be selected to ensure convergence of the accumulation value. In other embodiments, the length of time during which the write levelization procedure is performed may be set, as desired, to ensure convergence of the accumulation value. It is noted that the gain provided by gain unit 710 may dictate the number of iterations or time that may be required until suitable convergence of the accumulation value is achieved. Following the write levelization procedure, the strobe signal generator 110 may utilize the determined delay value to set a delay associated with the generation of the corresponding strobe signal to perform normal memory read and write operations.

In some embodiments, the gain provided by gain unit 710 may be adjusted automatically during the write-levelization procedure to speed convergence. For example, the gain may be initially set to a relatively high value (e.g., +8). After a predetermined number of accumulation cycles, the gain may be lowered (e.g., to a value of +1), thereby allowing refined adjustments to be made to the accumulation value as convergence is achieved. The lowering of the gain in such embodiments may be performed in a single gain-change step, or may be performed by iteratively lowering the gain across several discrete values over time. In still further embodiments, changes in the gain of gain unit 710 may be made in response to particular conditions, such as a detection of a phase reversal in the DQS signal relative to the MemClk signal.

It is further noted that in various embodiments, the accumulation value maintained by accumulator 225 may initially be set with a predetermined value (e.g., a seed value). For example, an initial value may be programmed within accumulator 225 upon initialization through the execution of BIOS (Basic Input/Output System) code of a computer system in which memory controller 100 may be deployed. For example, bit [n] of the sub-fine delay field may be initialized with a value of "1", while the lower order bits of the sub-fine delay field may be initialized with a value of "0". The DLL control field [i.e., bits c:n+1] and the coarse delay field [i.e., bits M:c+1] may similarly be initialized with particular starting values, as desired.

Figure 12:
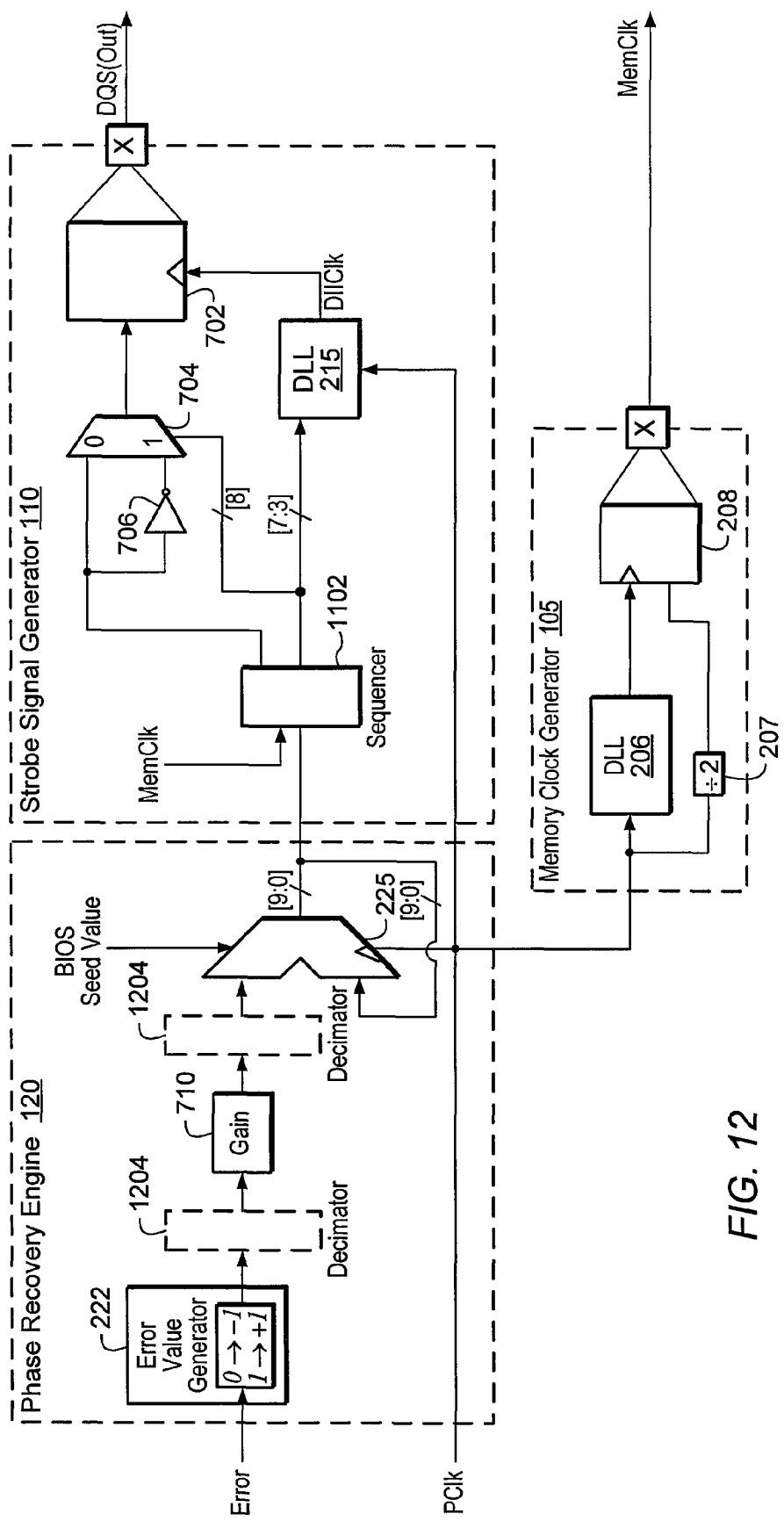
FIG. 12 is a block diagram illustrating a further particular implementation of a strobe signal generator and a phase recovery engine.
Figure 13:
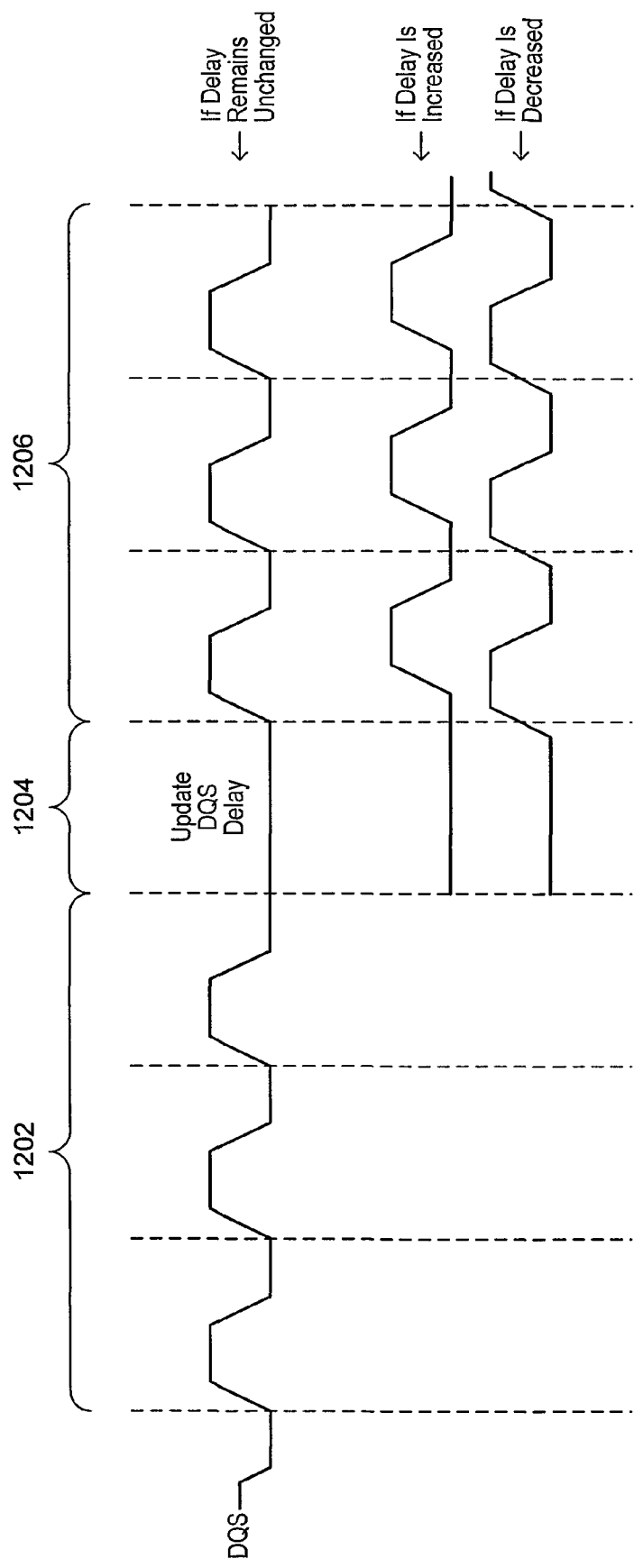
FIG. 13 is a timing diagram illustrating a repeating sequence of DQS cycles followed by a delay period, according to one embodiment.

Although in the above description of FIG. 7, the DQS signal as generated by strobe signal generator 110 cycles continuously at the frequency of the MemClk signal during the write levelization procedure, and the accumulation value is updated according to an error indication received in response to each DQS cycle, other embodiments are also possible. For example, FIG. 12 illustrates an embodiment wherein a sequencer 1102 is provided within strobe signal generator 110. During operation, as illustrated in FIG. 13, sequencer 1102 operates to control strobe signal generator 110 such that a sequence 1202 of a predetermined number of cycles of the DQS signal are generated followed by a delay period 1204, in a repeating fashion. In such an embodiment, an error indication associated with each cycle of the sequence 1202 may be provided to phase recovery engine 120 and, in a manner as described above, cause the accumulation value associated with accumulator 225 to be updated accordingly. However, sequencer 1102 may only allow the delay associated with generation of the DQS signal to be changed following an entire sequence 1202 of cycles of the DQS signal (e.g., during delay period 1204), rather than upon every cycle of the DQS signal. In other words, phase recovery engine 120 may still accumulate the value associated with the error indication received in response to each cycle of the DQS signal. However, instead of allowing the accumulation value to potentially change the delay associated with strobe signal generator 110 as a result of every cycle, the delay associated with the DQS signal generated by strobe signal generator 110 may only be changed (e.g., during the delay period 1204) following the entire sequence 1202 of cycles of the DQS signal. FIG. 13 also variously illustrates the subsequent generation of a second sequence 1206 of the predetermined number of cycles of the DQS signal that may be generated if the delay remains unchanged, if the delay is increased, or if the delay is decreased. It is noted that the predetermined number of cycles generated in each sequence (1202, 1206) as controlled by sequencer 1102 may be programmable, as well as the length of delay period 1204. It is also noted that in such embodiments, one or more decimators 1104 may be provided within phase recovery engine 120 to prevent the accumulation of values output from error value generator 222/gain unit 710 during the delay period 1204.

Figure 14:
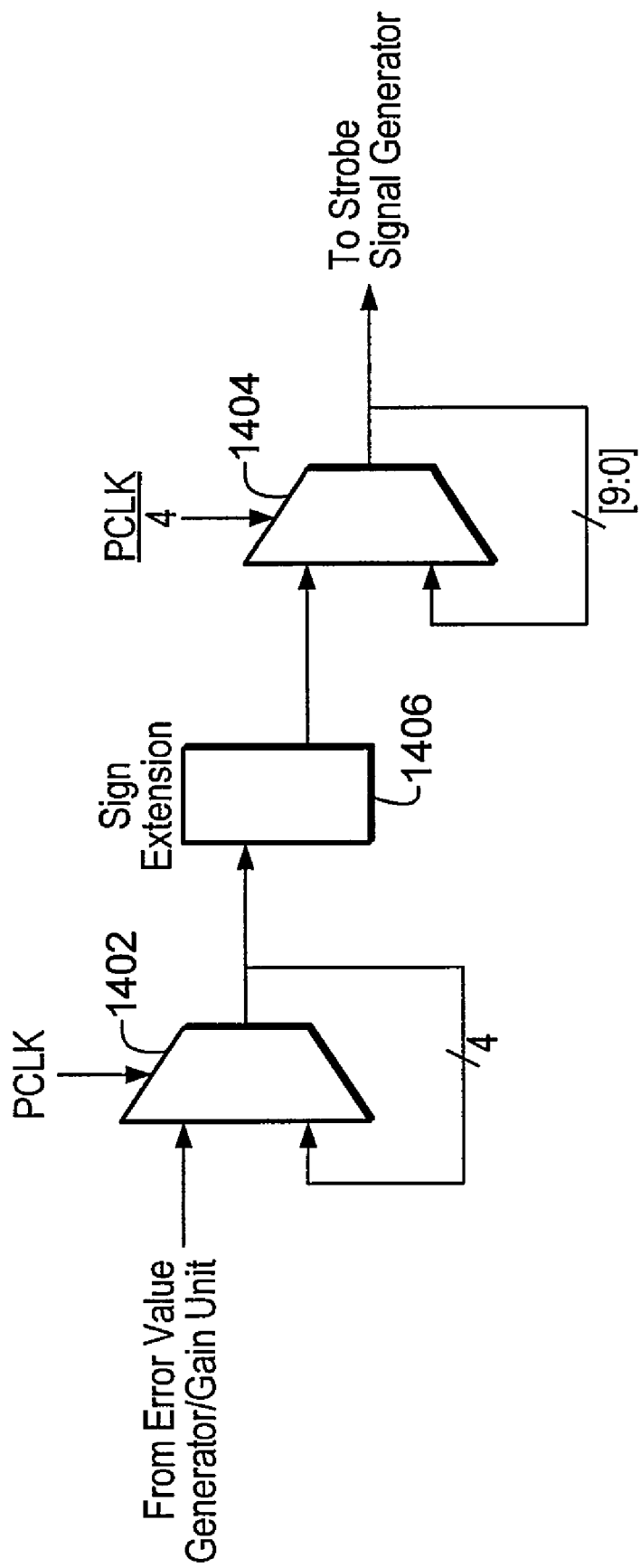
FIG. 14 is a block diagram illustrating a particular implementation of an accumulator.

It is also noted that various components generally depicted by the block diagrams of FIGS. 3, 7 and 12 may be implemented using various specific circuit configurations and techniques. For example, in one particular implementation, accumulator 225 may be implemented using a multi-stage integrate-and-dump configuration. Such an implementation is illustrated in FIG. 14 in which accumulator 225 is implemented using a first accumulator 1402 (e.g., a four-bit wide accumulator in this example) that is clocked by the internal clock signal PClk. A second accumulator 1404, which is coupled to receive an output of accumulator 1402 (appropriately sign-extended by sign extension unit 1404), maintains the entire accumulation value (e.g., bits [9:0]), but may be clocked by a slower clock signal (e.g., having a frequency of PClk/4 in this instance). The implementation of accumulator 225 as illustrated in FIG. 14 may consume less power and may be simpler to make function at higher data rates in comparison to implementations that utilize a single stage accumulator.

In addition, it is finally noted that strobe signal generator 110 may employ other specific circuitry and/or circuit configurations to control the delay associated with the generation of the associated DQS signal depending upon the accumulation value provided from phase recovery engine 120. For example, in some embodiments, flip-flop 702 may be replaced with a different specific implementation of a sampling circuit. In addition, in some embodiments, DLL device 215 may be configured to generate an output signal that can be selectively delayed across a range of delays that spans the entire period of the MemClk signal (i.e., 2 UI). In such embodiments, flip flop 702 as well as multiplexer 702 may be omitted entirely, and the DQS signal may be derived directly from the output of the DLL device 215. Furthermore, it is noted that the choice of the specific number of bits forming each field of the accumulation value (i.e., the sub-fine delay bits, the DLL control bits, and the coarse delay bits) as well as the gain provided by gain unit 710 may be selected as desired to optimize performance for a given implementation.

Figure 15:
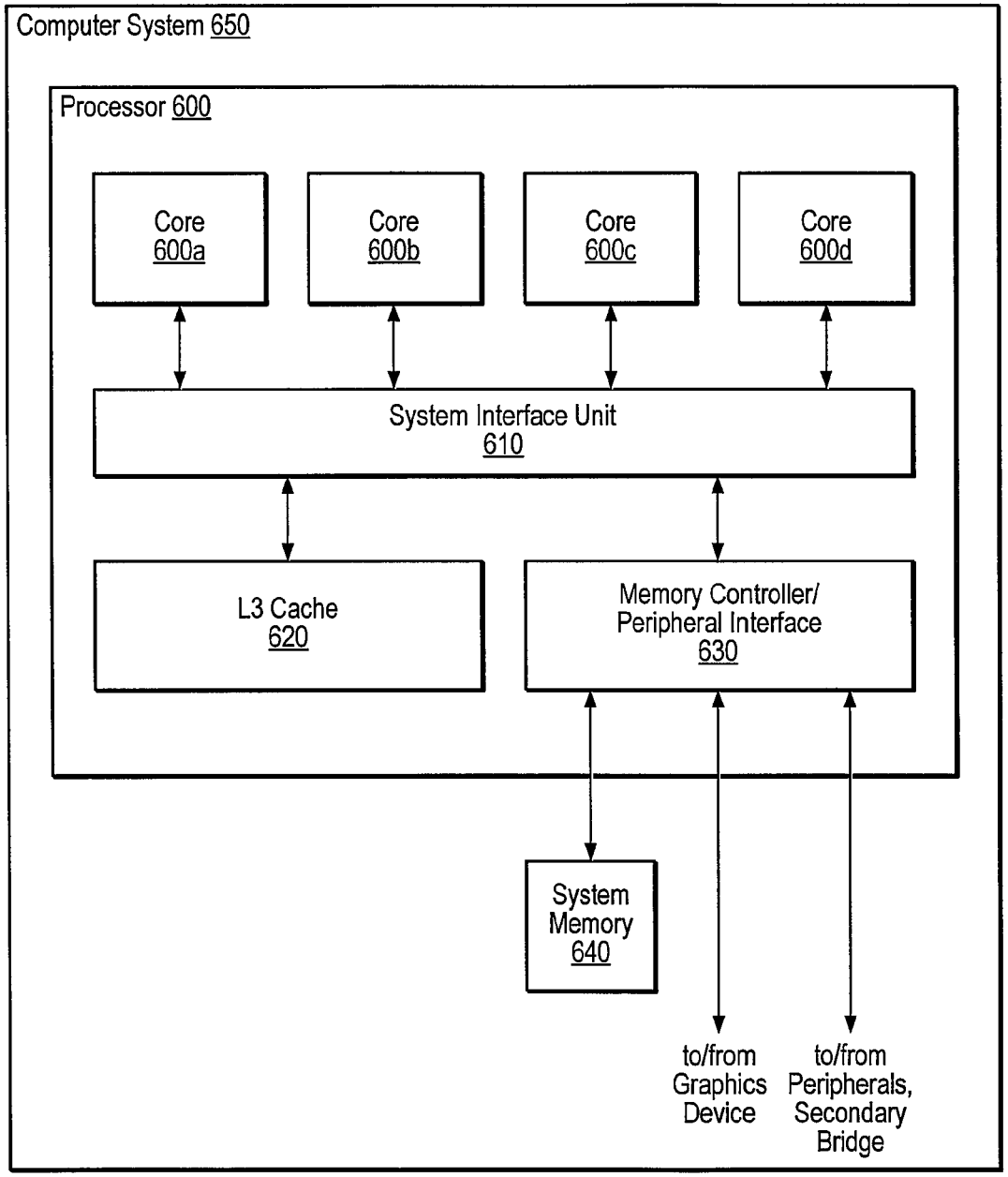
FIG. 15 is a block diagram of one embodiment of a computer system including a processor and a system memory.

FIG. 15 is a block diagram of one embodiment of a computer system 650 including a processor 600 and a system memory 640. Processor 600 may include one or more processor cores, e.g., processor cores 601A-D, fabricated as part of a single integrated circuit along with other structures. Each processor core 601 may be configured to execute instructions that may be stored in a system memory 640. Such instructions may be defined according to a particular instruction set architecture (ISA). For example, processor cores 601 may be configured to implement a version of the x86 ISA, although in other embodiments cores 601 may implement a different ISA or a combination of ISAs.

In the illustrated embodiment, each of the cores 100 may couple to an L3 cache 620 and a memory controller/peripheral interface unit (MCU) 630 via a system interface unit (SIU) 610. In one embodiment, L3 cache 620 may be configured as a unified cache, implemented using any suitable organization, that operates as an intermediate cache between L2 caches of cores 100 and system memory 640.

MCU 630 may be configured to interface processor 600 directly with system memory 640. For example, MCU 630 may be configured to generate the signals necessary to support one or more different types of random access memory (RAM) such as DDR-3 SDRAM. MCU 630 may include the functionality of memory controller 100 described above with reference to FIGS. 1-14 to support a write levelization algorithm to phase align each of a set of data strobe (DQS) signals relative to a memory clock (MemClk) signal at system memory 640. System memory 640 may be configured to store instructions and data that may be operated on by the various cores 100 of processor 600, and the contents of system memory 640 may be cached by various ones of the caches described above.

Additionally, MCU 630 may support other types of interfaces to processor 600. For example, MCU 630 may implement a dedicated graphics processor interface such as a version of the Accelerated/Advanced Graphics Port (AGP) interface, which may be used to interface processor 600 to a graphics-processing subsystem, which may include a separate graphics processor, graphics memory and/or other components. MCU 630 may also be configured to implement one or more types of peripheral interfaces, e.g., a version of the PCI-Express bus standard, through which processor 600 may interface with peripherals such as storage devices, graphics devices, networking devices, etc. In some embodiments, a secondary bus bridge (e.g., a "south bridge") external to processor 600 may be used to couple processor 600 to other peripheral devices via other types of buses or interconnects. It is noted that while memory controller and peripheral interface functions are shown integrated within processor 600 via MCU 630, in other embodiments these functions may be implemented externally to processor 600 via a conventional "north bridge" arrangement. For example, various functions of MCU 630 may be implemented via a separate chipset rather than being integrated within processor 600.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A memory controller comprising:
   a clock generator configured to generate a clock signal for a memory device;
   a strobe signal generator configured to generate a strobe signal for the memory device; and
   a phase recovery engine configured to receive an error signal from the memory device, wherein the error signal conveys an error indication indicative of an alignment of the strobe signal relative to the clock signal for each of a plurality of cycles of the strobe signal, wherein the phase recovery engine includes an accumulator configured to maintain an accumulation value that depends upon the error indications for the plurality of cycles of the strobe signal;
   wherein the strobe signal generator is configured to control a delay associated with generation of the strobe signal depending upon the accumulation value.

2. The memory controller as recited in claim 1 wherein the strobe signal generator includes a phase controllable signal generation device configured to control the delay associated with the generation of the strobe signal depending upon a plurality of bits of the accumulation value.

3. The memory controller as recited in claim 2 wherein the phase controllable signal generation device is a delay-locked loop (DLL) device, and wherein the accumulation value further includes one or more lower-order bits that form a sub-fine delay field.

4. The memory controller as recited in claim 3 further comprising a sampling circuit configured to generate an output representing the strobe signal, wherein an output signal of the DLL device is coupled to control clocking of the sampling circuit.

5. The memory controller as recited in claim 4 wherein the strobe signal generator is configured to selectively cause either a high phase or a low phase of the clock signal to be sampled by the sampling circuit depending upon at least one higher-order bit of the accumulation value.

6. The memory controller as recited in claim 4 wherein the sampling circuit is a flip flop.

7. The memory controller as recited in claim 1 wherein the phase recovery engine includes an error value generator configured to generate a first value in response to detecting a low state of the error signal and configured to generate a second value in response to detecting a high state of the error signal.

8. The memory controller as recited in claim 7 wherein the accumulator is configured to sum either the first value or the second value, or a value dependent thereon, with a current accumulation value upon each cycle of the strobe signal.

9. The memory controller as recited in claim 1 wherein the accumulation value maintained by the accumulator is programmable to allow the accumulator to be initialized with a particular starting value.

10. The memory controller as recited in claim 1 wherein the strobe signal generator further includes a sequencer configured to cause the strobe signal generator to repetitively generate a sequence of a predetermined number of cycles in the strobe signal followed by a delay period.

11. The memory controller as recited in claim 10 wherein the predetermined number of cycles and the length of the delay period are programmable.

12. A system comprising:
   a memory device; and
   a memory controller coupled to the memory device, wherein the memory controller includes:
      a clock generator configured to generate a clock signal for the memory device;
      a strobe signal generator configured to generate a strobe signal for the memory device; and
      a phase recovery engine coupled to receive an error signal from the memory device, wherein the error signal conveys an error indication indicative of an alignment of the strobe signal relative to the clock signal for each of a plurality of cycles of the strobe signal, wherein the phase recovery engine includes an accumulator configured to maintain an accumulation value that depends upon the error indications for the plurality of cycles of the strobe signal;
      wherein the strobe signal generator is configured to control a delay associated with the strobe signal depending upon the accumulation value.

13. The system as recited in claim 12 wherein the strobe signal generator includes a phase controllable signal generation device configured to control the delay associated with the generation of the strobe signal depending upon a plurality of bits of the accumulation value.

14. The system as recited in claim 13 wherein the phase controllable signal generation device is a delay-locked loop (DLL) device, and wherein the accumulation value further includes one or more lower-order bits that form a sub-fine delay field.

15. The system as recited in claim 14 further comprising a sampling circuit configured to generate an output representing the strobe signal, wherein an output signal of the DLL device is coupled to control clocking of the sampling circuit.

16. The system as recited in claim 15 wherein the strobe signal generator is configured to selectively cause either a high phase or a low phase of the clock signal to be sampled by the sampling circuit depending upon at least one higher-order bit of the accumulation value.

17. The system as recited in claim 12 wherein:
   the phase recovery engine includes an error value generator configured to generate a first value in response to detecting a low state of the error signal and configured to generate a second value in response to detecting a high state of the error signal; and the accumulator is configured to sum either the first value or the second value, or a value dependent thereon, with a current accumulation value upon each cycle of the strobe signal.

18. A method comprising:
providing a clock signal and a strobe signal to a memory device;
receiving an error signal from the memory device, wherein the error signal conveys an error indication indicative of an alignment of the strobe signal relative to the clock signal for each of a plurality of cycles of the strobe signal;
maintaining an accumulation value that depends upon the error indications for the plurality of cycles of the strobe signal; and
controlling a delay associated with generation of the strobe signal depending upon the accumulation value.

19. The method as recited in claim 18 wherein controlling the delay associated with generation of the strobe signal includes controlling the delay associated with a DLL device according to a first plurality of bits of the accumulation value.

20. The method as recited in claim 19 wherein controlling the delay associated with generation of the strobe signal further includes:
selectively causing either a high phase or a low phase of the clock signal to be provided to a sampling circuit depending upon at least one higher order bit of the accumulation value; and
controlling a clocking of the sampling circuit with an output of the DLL device.

* * * * *